Oct. 21, 1947. C. O. SLEMMONS 2,429,242
TRACK FOR TRACK-LAYING VEHICLES
Filed Oct. 30, 1945
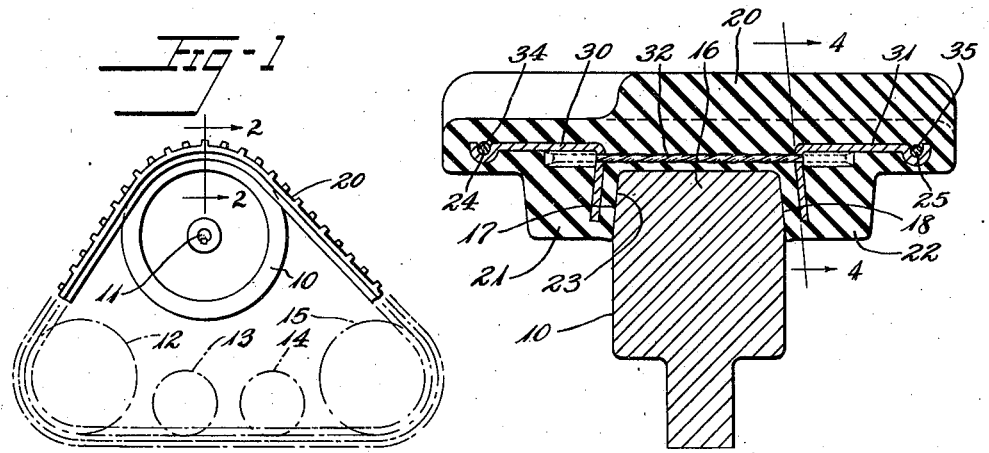
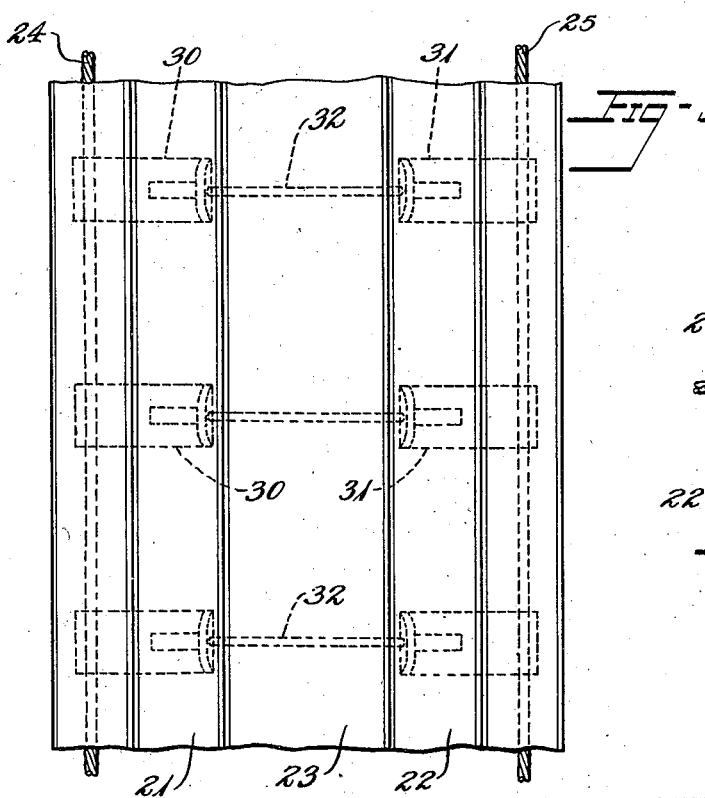
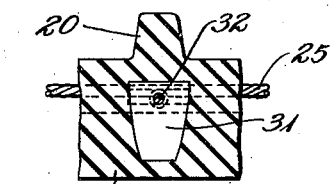
Inventor
Charles O. Slemmons
By
Att'y Patented Oct. 21, 1947

2,429,242

UNITED STATES PATENT OFFICE 2,429,242

TRACK FOR TRACK-LAYING VEHICLES

Charles O. Slemmons, Akron, Ohio, assignor to The B. F. Goodrich Company, New York, N. Y., a corporation of New York Application October 30, 1945, Serial No. 625,482

4 Claims. (Cl. 305—10)

1

This invention relates to tracks for self-laying track-type vehicles and is especially useful for agricultural and industrial tractors, although it is also of use on military and other track laying vehicles.

Objects of the invention are to provide a highly efficient frictional drive, to provide lateral gripping of the drive wheel proportionate with the pressure of the track against the wheel due to tensioning of the track, and to provide simplicity of construction.

These and other objects will appear from the following description and the accompanying drawings.

Of the drawings:

Fig. 1 is a side elevation of a vehicle drive made in accordance with and embodying the invention, parts being broken away and indicated by dot-and-dash lines.

Fig. 2 is a cross-section thereof taken on line 2—2 of Fig. 1.

Fig. 3 is a face view of a section of the track as seen from the wheel-contacting side, parts being broken away.

Fig. 4 is a detail sectional view taken on line 4—4 of Fig. 2.

Referring to the drawings, the numeral 10 designates a drive wheel mounted on an axle 11 from which it is driven by the engine of the vehicle. Idler wheels 12, 13, 14, 15 are mounted on a vehicle undercarriage (not shown) which is supported from the vehicle. As shown in Fig. 2, the drive wheel has a narrow rim 16 having outwardly converging sides 17, 18. The guide wheels have similar rims for contacting the track.

The band track 20 is a flexible body of soft vulcanized rubber or other rubber-like material provided on its inner wheel-contacting face with a pair of parallel continuous longitudinal ribs 21, 22 defining therebetween a continuous groove 23 substantially complemental in size and shape to the rim of the drive wheel. The track extends laterally beyond the drive wheel at each side thereof and located within the body of the track near its margins are longitudinally extending tension members 24, 25 of cord or cable entirely embedded in the rubber-like material. The tension members are located a considerable distance laterally beyond the sides of the drive wheel rim so that tension of the tension members will cause narrowing of the groove 23 increasing the grip of the track upon the rim of the wheel.

To provide increased pressure of the sides of the track against the drive wheel, L-shaped levers 30, 31 of stiff material, such as metal, are em-

2 bedded in the body of the track laterally of the drive wheel groove with one arm of each lever extending laterally of the track and having an end engaged under a tension member while the other arm of each lever extends radially inward of the drive wheel near a marginal face of the drive wheel. Opposite levers are held in spaced-apart relation at fulcrum points at the angles of intersection of their arms by laterally extending tension members 32 embedded in the body of the track. The laterally extending arms of the levers are formed with grooves such as 35 for engaging about the tension members 24, 25. The levers 30, 31 are arranged in opposite pairs spaced apart at regular intervals throughout the extent of the track.

In operation, as the drive wheel is located within a curved reach of the track longitudinal tensioning of the track causes the marginal portions of the track to be drawn toward the axis of the drive wheel.

The tensioning of the tension members 24, 25 causes the lateral arms of levers 30, 31 to be rocked about their fulcrum points moving their radial arms toward the side faces of the wheel rim and increases the pressure of the track ribs against the sides thereof, thereby tightly gripping the wheel.

Variations may be made without departing from the scope of the invention as it is defined by the following claims.

I claim:

1. A track for self-laying track type vehicles, said track comprising a band of rubber-like material having on the drive wheel engaging face thereof ribs defining a longitudinal wheel engaging groove, longitudinally extending tension members embedded in said band at its margins, and means embedded in said band for transmitting force from said tension members to said ribs to increase lateral pressure on a driving wheel engaged in said groove, said means comprising levers each having an arm embedded in one of said rims, and an arm engaging a tension member.

2. A track for self-laying track type vehicles, said track comprising a band of rubber-like material having on the drive wheel engaging face thereof ribs defining a longitudinal wheel engaging groove, longitudinally extending tension members embedded in said band at its margins, and means embedded in said band for transmitting force from said tension members to said ribs to increase lateral pressure on a driving wheel engaged in said groove, said means comprising L-shaped levers each having a laterally extending arm engaging one of said tension members and a radially extending arm embedded in one of said ribs.

3. A track for self-laying track type vehicles, said track comprising a band of rubber-like material having on the drive wheel engaging face thereof ribs defining a longitudinal wheel engaging groove, longitudinally extending tension members embedded in said band at its margins, and means embedded in said band for transmitting force from said tension members to said ribs to increase lateral pressure on a driving wheel engaged in said groove, said means comprising levers each having an arm embedded in one of said ribs, and an arm engaging a tension member, said levers being arranged in opposite pairs, and fulcrum means connecting the fulcrum points of opposite levers.

4. A track for self-laying track type vehicles, said track comprising a band of rubber-like material having on the drive wheel engaging face thereof ribs defining a longitudinal wheel-engaging groove, longitudinally extending tension members embedded in said band at its margins, and means embedded in said band for transmitting force from said tension members to said ribs to increase lateral pressure on a driving wheel engaged in said groove, said means comprising L-shaped levers each having a laterally extending arm engaging one of said tension members and a radially extending arm embedded in one of said ribs, said levers being arranged in opposite pairs, and fulcrum means connecting pairs of levers at their angled portions.

CHARLES O. SLEMMONS.